Feb. 12, 1946. W. H. COLBERT ET AL 2,394,533
COLORED MIRROR
Filed Feb. 16, 1943 4 Sheets-Sheet 1

INVENTORS
William H. Colbert.
Willard L. Morgan.
BY
ATTORNEYS

Patented Feb. 12, 1946

2,394,533

UNITED STATES PATENT OFFICE 2,394,533

COLORED MIRROR

William H. Colbert, Brackenridge, Pa., and Willard L. Morgan, Columbus, Ohio, assignors, by mesne assignments, to Libbey-Owens-Ford Glass Company, Toledo, Ohio, a corporation of Ohio Application February 16, 1943, Serial No. 476,076

6 Claims. (Cl. 88—105)

Our invention relates to colored mirrors. It has to do, more particularly with the production of mirrors having desired color and reflectivity characteristics. More specifically, it relates to the production of mirrors of desired color wherein the color is obtained primarily by producing interference of light rays which strike the mirrors.

This application is a continuation-in-part of our copending application Serial No. 473,473, filed January 25, 1943.

Despite the wide possible use of colored mirrors in furniture, store decoration, theater decoration and other decoration, sales displays, etc., and as automotive mirrors, and the possible use of colored reflective surfaces to add to the attractiveness of shaped glassware, there has been little use to date of such mirrors and surfaces due to the expense of producing them and the few shades available.

The accompanying drawings will aid in the understanding of our invention. In these drawings.

Figure 1:
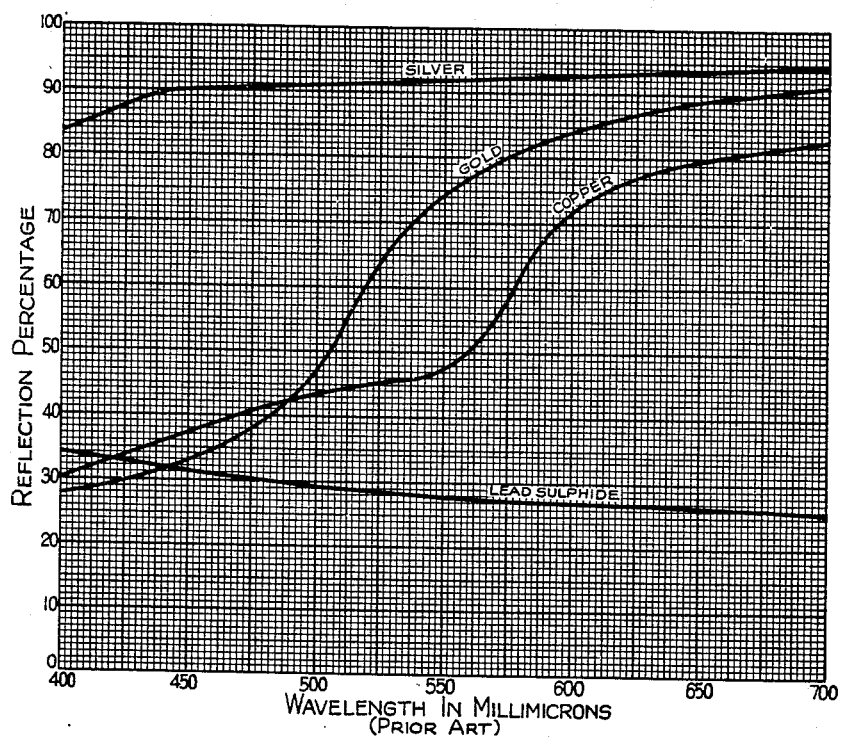
Figure 1 is a diagram showing spectral reflection curves for silver, gold, copper and lead sulfide mirrors of the prior art.

Silver mirrors, of 88–92% reflectivity value, made with clear ordinary plate glass have no color, since all the various light rays are reflected approximately equally, as seen from the spectral reflection curves in Figure 1. Some colored mirrors have been used commercially which were made by silvering colored glass, the color thereby secured being the color of the glass. The color of the glass arises from the fact that the glass absorbs some types of light rays more than others and the light rays which are transmitted, with the least absorption, thus impart the color to the glass. Thus, "Solex" green glass, made by Pittsburgh Plate Glass Company, is green because it absorbs much of the red and blue light out of the white daylight as such light passes through the glass. A green mirror, made with silver on the "Solex" green glass, shows a reflectivity value, for visible light, of 61% and similar mirrors, made with a blue glass and a flesh colored glass, showed reflectivity values of 35% and 68.5%. These are all lower than the reflectivity value of silver on the colorless glass, by reason of the loss of the colored light, which the colored glasses absorb. The use of such colored glasses is expensive and, moreover, satisfactory quality for forming mirrors is not readily available.

Using plain plate glass, some colored mirrors have been made in which the color arises from the selective reflection of the various light waves of different colors to different degrees. Thus, gold mirrors show a spectral reflection curve, as shown in Figure 1, and copper mirrors show a spectral reflection curve, as shown in Figure 1.

The gold mirror appears yellow because little green or blue is reflected while much larger amounts of yellow and red are reflected, the overall reflectivity of total visible light for gold mirrors being about 75%. The copper mirror, which reflects about 55% of all light, is orange-red, being different from the gold mirror in that most of the light reflected is red. Copper mirrors have not been commercialized due to the unreliable methods for their production. Gold mirrors are expensive and, therefore, have not gone into wide use.

The use of fuchsin or methyl violet dyestuffs in opaque layers for mirror surfaces has been suggested. Such mirror surfaces reflect 11.6% of the total visible light. Experience with such mirrors indicates that where such dyes are used as the reflective layer they must be present in fairly thick opaque layers and the reflectivity percentage is always low and the mirrors quite dark. The colors secured are invariably the complementary color to the normal color of the dyestuff when seen in solutions by transmission. Thus, methyl-violet gives a green mirror since the film transmits red and violet light and reflects, selectively, the green light which it does not transmit. Thus, the color in these mirrors arises solely by selective reflection, just as is the case with gold, which when viewed by transmission is green, the gold being relatively transparent to green light but opaque to the red and yellow light which it reflects selectively. Mirrors of this type are not stable, the films rapidly breaking up and spotting and in service the color soon changes to muddy non-reflective grays. As a result they have had no commercial use in spite of the demand for colored mirrors.

Mirrors made with platinum, iridium, or aluminum are silvery in appearance and without color, while those made with chromium, silicon, or lead sulfide are dark and without color tone. Likewise, glass coated with asphalt or black paint, with reflectivity values of 5%, and mirrors of black opaque glass, with 5% reflectivity, are not very useful because of their extremely low reflectivity values and the very dark images which thus appear in such reflective surfaces.

Thus, despite the wide possible use of colored mirrors and colored mirror surfaces, there has been little use to date because of the expense of producing such mirrors and surfaces and the few colors and shades available, as shown above.

One of the objects of our invention is to provide colored mirrors or other reflective surfaces of a wide range of color characteristics and of a wide range of reflectivity percentage characteristics which can be controlled as desired.

Another object of our invention is to provide mirrors or other reflective surfaces of various colors and reflectivity values in which the colors are mainly secured by light interference effects and are permanent and inexpensive.

Various other objects will be apparent from the following description.

The colors which appear in thin-walled soap bubbles and in very thin oil films do not arise from any inherent color in the soap film or in the oil. Also, in these cases, it is well recognized that the colors do not come from any selective color light-absorption effects, as the soapy water and oil do not show any color directly. As the soapy water and oil in bulk are also clear and transparent and non-reflective, it is apparent that the colors do not arise from any selective reflection of light. The colors are known to occur from interference of the light rays, which results in a neutralization or loss of certain colored lights and the residual light which then appears is, obviously, colored. The particular color of light rays removed by interference is dependent upon the thickness of the film and its refractive index, as will be shown later. It is well known that interference colors can only appear in extremely thin films which are of a thickness comparable to one-fourth the wave length of light and which are at least partially transparent.

We have found that by depositing reflective coatings of various materials in extremely thin films which are still partially or considerably transparent and show interference colors and backing these with a relatively opaque reflective coating of another material, we can secure a wide range of colored mirrors of various reflective characteristics for the various rays of light and in terms of total light reflection. We obtain these effects by simple and inexpensive means and colored substances or colored glass are not necessary. The colors are permanent and do not fade or alter, as they are dependent primarily upon physical light interference effects.

We have found that by the controlled deposition of very thin uniform semi-transparent films of many materials we can secure reflecting bodies of a wide range of color and reflectivity characteristics. The material used as the reflecting substance need not have any inherent color. Such mirror bodies have been described more particularly in our co-pending applications Serial Nos. 473,473 and 473,474, filed January 25, 1943. By backing the semi-transparent mirror layer with a relatively opaque or semi-opaque mirror layer of a second material of good reflectivity, which may or may not be colored, we produce by the cooperative action of the two reflective layers entirely new and different mirrors with characteristic color and reflectivity properties. Other combinations of reflective layers may be employed according to our invention. For example, we may employ a semi-transparent interference layer, backed up by a transparent layer, which may have color, and which is backed up by a relatively opaque layer. Any desired number and arrangement of layers may be provided as long as one is a semi-transparent interference layer and is backed up by at least one layer which is more opaque than the semi-transparent layer.

Figure 2:
Figure 2 is a diagram illustrating light waves of a single ray of a definite color.
Figure 3:
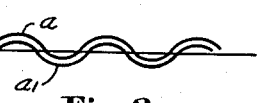
Figure 3 is a diagram illustrating light waves of two rays of the same type vibrating in the same wave phase.
Figure 4:
Figure 4 is a view similar to Figure 3 but showing the rays vibrating in opposite phase.

The development of colors by light interference has been explained upon the basis that light radiations are of a wave form, such as shown in Figure 2, which represents a single ray $a$ of a definite color. Blue light differs from red in that the length of the waves is shorter, in the case of the blue, and longer, in case of the red. The other visible colored rays of light are of intermediate wave lengths. White light is composed of a mixture of all of these visible rays. If two rays of the same monochromatic type or wave length, such rays $a$ and $a'$, happen to be vibrating in the same wave phase, as in Figure 3, they amplify each other and the intensity is increased. However, if they happen to be vibrating in opposite phase, as shown at $a^2$ and $a^3$ in Figure 4, they interfere with or oppose each other and a loss of light intensity results. Thus, if in some way we can make some of the blue rays in ordinary white light get out of phase with other blue rays of the same wave length, we can remove some of the blue from the ordinary light.

The remaining light will then no longer be white but of a color resulting from the remaining green, yellow, orange and red rays and will appear a reddish-yellow color.

Figure 5:
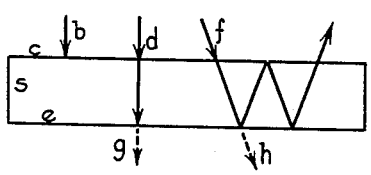
Figure 5 is a diagram illustrating how various light rays will be reflected from a reflecting layer.

If we consider two light rays impinging upon a reflecting substance s, as in Figure 5, and assume that ray b is reflected at the top surface c while ray d passes on through the semi-transparent base s to the bottom surface e before it is reflected, it is apparent that the second ray has had a longer path to travel before it again emerges from the top surface c of the layer s. Thus, the ray d lags considerably behind the ray b and in consequence, the crests and troughs of the waves of the two rays may not necessarily coincide. The time difference between the waves of rays d and b can be arranged so that the difference in phase is such that interference of the waves of two of such rays, entering or being reflected at any point on the surface of s, will occur. The time difference between the waves of the two rays will be dependent upon the thickness of the layer s and the speed with which the given light ray travels in the material comprising the layer s.

As the number of complete wave cycles which any given monochromatic light ray makes per second or its frequency is a fixed constant, the variation in speed of travel of the light ray in different media causes a shortening or lengthening of the actual length of a wave as it travels through the various media. Wave lengths for light are generally given with reference to their values in traveling through air and the speed of travel for all light rays in this medium is given as 299,910,000 meters per second. In denser materials, the light rays move slower and all the light rays do not necessarily move at the same speeds. The proportionality constant N between the velocity of light in a given substance and the velocity of light in air is called the refractive index for that substance.

$$N = \frac{\text{Velocity in air}}{\text{Velocity in substance}} = \frac{\text{Wave length in air}}{\text{Wave length in substance}}$$

If by $\lambda_a$ we indicate the wave length in air and by $\lambda_s$ the wave length in some other substance, it is apparent that these are simply related as follows:

$$\lambda_s = \left(\frac{1}{N_s}\right)\lambda_a$$

N varies somewhat with different monochromatic waves of different wave length but a similar equation holds for each wave length considered. In general, as the variations are usually small, a single constant for N can frequently be applied for all waves in the visible light range.

In order for the ray d to come out of the top surface and be 180 degrees out of phase and to thus interfere with the ray b, assuming both rays to be striking the surface of the layer substantially at right angles, the ray d must be slowed down in time and distance equal to the distance of one half of a wave length of the ray in air, i. e.

$$\frac{\lambda_a}{2}$$

As the ray is traveling only 1/N as fast in the substance s, comprising the layer, and must traverse the thickness of the layer twice, the thickness of s required to cause an equivalent slowing effect is then $$\frac{\lambda_a}{4N_s}$$

In a similar way, thicknesses equal to 1, 3, 5 or any uneven integral multiples of this quantity should also show interference effects. If the ray d is reflected within the layer s not once but two times, it is apparent that the film needed for interference need be only $$\frac{\lambda_a}{8N_s}$$

thick. Thus, as shown in Figure 5, wherein the ray f is shown as an inclined ray striking the surface of the layer the light ray is reflected twice within the layer. If the ray is reflected any number of times, such as R times, then the film needed is thinner and is of a necessary thickness as given by $$\frac{\lambda_a}{4N_sR}$$

Furthermore, it is apparent that similar thicknesses equal to 1, 3, 5 or any uneven integral multiples of such quantities will show interference effects with rays which are multiply reflected within the layers. Thus, the suitable film thicknesses for our films are of the order of one-fourth of a wave length of any visible light ray or some small multiple or submultiple of this, divided by the refractive index of the material used in the semi-transparent film.

Since the various colored rays of light have different wave lengths and these range from 4000 to 7500 Angstrom units or 0.4 to 0.75 micron or thousandth millimeter in the visible spectrum, it is obvious that a semi-transparent film which is thick enough to cause interference with the short blue rays will not cause interference with the long red rays, etc. Thus, each thickness of semi-transparent film will take out certain defined portions of the spectrum and a film will taken on a series of different colors as the thickness is varied. As will be shown in the examples which follow, the colored mirrors of our invention produced by light interference, show varied colors, depending upon the thickness of semi-transparent mirror film employed. In the spectral reflection curves for these mirrors, the portion of the curve and minima of reflectivity caused by interference shifts from the blue range of wave length toward the red, as the semi-transparent film is made thicker. The semi-transparent film must be of very uniform thickness, if the color is to be the same throughout the mirror. This has called for special means of producing such semi-transparent reflective layers, in view of the extreme uniformity and extreme thinness of the semi-transparent layers desired. On the other hand, it is within the scope of our methods to produce colored mirrors of mottled or variegated colors where the semi-transparent film thicknesses are deliberately varied to cause such effects.

As has already been stated, previous mirror films, known to the prior art, have either been colorless or of a fixed color which was not secured by interference effects but was the normal color of the material, such as in the case of gold and copper films. Interference effects in perfectly transparent materials do not occur beyond about the ninth multiple of the quarter wave length factor already described. In semi-transparent materials, the increasing absorption of light by the increasing thickness of film, which is exponential with respect to the thickness, may soon leave so little light reflected from the bottom surface e that no interference effect can be found in the reflected light which is then coming entirely from the top surface c. Obviously if a mirror is opaque all of the light is absorbed before ever striking the surface e and, therefore, no light is thrown back to cause interference effects, particularly as the film obviously must be traversed twice if interference is to be obtained. Since most commercial mirrors have been made with mirror layers thick enough to be opaque, they have not shown any interference colors and their entire reflection occurs at the top surface of the mirror layer. The occurrence of interference by multiple reflection within the layer, as shown in Figure 5 with ray f, is very quickly limited by the transmission values for the film and, in practice, we have not found evidence for more than two to four such internal reflections although more may occur in more highly transparent films.

It is thus apparent that the amount of light which comes back through our semi-transparent mirror film and is then available at its upper surface to cause light interference effects is a function of the transparency of the material used in the semi-transparent layer, the transparency being considered with respect to the particular wave length of light at which interference is developed as determined by the film thickness. The transparency of the film with respect to ordinary visible light generally is thus important and we use films which are semi-transparent or which show a visible light transmission of 10 to 90% in the thickness employed.

The amount of light reflected from the surface of the semi-transparent layer is a function of the refractive index, being greater the larger the refractive index for the substance comprising this film, and we find it also becomes greater as the thickness of the semi-transparent film increases until it is opaque. While it may thus be an advantage to use a material for the semi-transparent mirror layer which has a high refractive index to secure greater brilliancy of reflection and to permit the use of thinner, more transparent films, thus giving greater efficiency of light removal by interference and thus giving purer and deeper color tones, we do not restrict ourselves to the use of any particular range of refractive index materials but may use a wide range of substances. It is apparent that a material of about 50% reflectivity value, when viewed in a normally opaque thick film, which can be laid down in very thin films which are of high transparency, will show the brightest and deepest interference colors as mirrors. We may, however, use materials which in their ordinary opaque films or in bulk show much higher or lower reflectivity values than this constant, although values lying between 80 and 20% are preferred. Thus, thin calcium fluoride coatings will reflect something less than 10% of the light at the top surface and are very transparent and the reflected light coming from the back surface causes interference colors to develop but the depth of color resulting is low due to the white light mixed with the colored light being of a high intensity. It is necessary that the film used for our mirrors have the characteristic of giving specular or mirror type reflection of light, since diffuse type reflection is not satisfactory.

Figure 6:
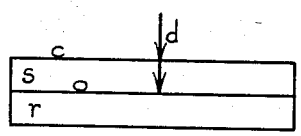
Figure 6 is a view similar to Figure 5 but illustrating a combination of reflecting layers according to our invention.

We find that when our thin semi-transparent reflective films, in which interference colors are developed, are backed up with a relatively thick semi-opaque or relatively opaque film of another mirror material that light, which is normally lost out of the back of our thin semi-transparent mirror films, is reflected and returned out through the face of the mirror combination with consequent higher reflectivity values. Thus, in Figure 5 the dotted arrows g and h indicate some light which is normally transmitted through the semi-transparent mirror film s, which is not reflected at surface e, and which is, consequently, lost out the back of the mirror. By backing up the semi-transparent mirror film s with an opaque mirror body r, as illustrated in Figure 6, we obtain a reflection of a considerable portion of the light represented in rays g and h in Figure 5. This results in increased general light reflectivity of the mirror as a whole which includes such a combination of layers. Furthermore, if the semi-transparent mirror film is of a thickness that the reflected blue rays, for example, are out of phase and are, therefore, destroyed by interference, this increased reflection for blue light at surface o results in more light for interference at the top surface c and greater destruction of blue light. Thus, the red color of the mirror is also intensified. For this to happen it is not only necessary that the semi-transparent film be fairly transparent to blue light but that the relatively opaque reflecting body r reflect blue light. If the semi-transparent layer is also a good transmitter of red rays and the relatively opaque layer reflects red rays, an intensification of reflected red light is secured by the use of the relatively opaque backing mirror layer. Thus, still greater intensification of the red color of the mirror is secured. In general, brighter deeper color tone mirrors of higher reflectivity are thus secured by the use of a relatively opaque mirror film in back of our semi-transparent mirror layers, and a wide variety of colors and reflectivities can be secured in our mirrors.

Where the semi-transparent reflective film is selectively more transparent to some colors or specific wave lengths, such as red in the case of lead sulfide and green in the case of gold, we find that by backing up our very thin reflective films with a thick relatively opaque film of another mirror body, such as silver particularly which is a good reflector for all colors of light as shown in Figure 1, these rays are then returned out through the face of the mirror with consequent higher reflection for these particular rays. Thus, while the mirrors made with extremely thin lead sulfide semi-transparent coatings, which have been backed up by forming a relatively opaque silver mirror layer over the lead sulfide, show the spectral range of colors, depending upon the thickness of the lead sulfide used, these mirrors reflect more light and are brighter, in consequence, and are also of definitely redder tones, excepting where interference occurs in the red, than the similar mirrors having only the semi-transparent lead sulfide coating. With thin semi-transparent gold mirrors backed by relatively opaque silver, the mirrors are also mostly brighter and of higher reflectivity in the green than the mirrors having the gold coating only.

We may use many other relatively opaque mirror films, other than silver, behind our semi-transparent thin film mirror layers for the purpose of modfying the general hues and reflectivities of those layers and of thereby securing new colored mirrors. In general, any material giving a specular mirror reflectivity, rather than the non-useful diffuse type reflectivity, and of a total reflectivity of over 15% has been found to be useful as a relatively opaque mirror backing layer for use with the thin semi-transparent reflective films, in forming our compound mirrors described. The high general reflectivity for all types of visible light make silver and aluminum with 90% reflectivities, magnesium with 73% reflectivity, platinum with 63% reflectivity, iron with 55% reflectivity, nickel with 60% reflectivity, rhodium with 75% reflectivity, as well as cobalt, iridium, indium, antimony, molybdenum, palladium, cadmium and other silvery appearing metals, quite useful as backing reflectors. We may also use opaque lead sulfide films of 30% reflectivity, as shown in Figure 1, or molybdenum or antimony sulfides of about 40% reflectivity, or other metallic sulfides or minerals having a metallic reflection.

Mirror materials of selective color reflectivity characteristics are of value as backing reflectors in combination with the semi-transparent interference colored reflective films in that a further means of modifying the color characteristics of the compound mirror, thus formed, is secured. Thus, we may use a relatively opaque relatively thick layer of gold or of pyrite on the back of a thin semi-transparent layer of lead sulfide which shows interference colors. In Figure 1 while gold shows about 77% reflectivity, the higher selective reflection of red and orange light by ordinary opaque gold mirrors is quite apparent. Copper and its oxide cuprite both reflect strongly in the reds. Silicon and selenium reflect more strongly in the blue than in the remaining visible light, the reflectivity ranging from 40% in the blue, in each case, down to 28 and 25% in the red, in the respective cases.

It is necessary that the material comprising the backing mirror be of a different material and of a different refractive index from the substance comprising the very thin semi-transparent reflective mirror so that a definite light reflective surface be formed on the front of the backing layer.

As a material suitable for the forming of the very thin semi-transparent reflective layers, we have found the use of very thin films of lead sulfide to give particularly attractive results. In its use in the normal opaque mirrors of fairly thick films, it is a practically colorless mirror, as shown by Figure 1, which shows the reflectivity, about 30%, for all the wave lengths of light to be about the same. It has a high refractive index of 3.9 and is quite transparent in the thicknesses which will cause interference effects. Gold, having a refractive index of 1.18 at 4400 Angstroms and of 0.47 at 5890 with a normal reflectivity curve, as shown by Figure 1, is quite transparent in very thin films to green light. So also is copper which reflects, as shown in Figure 1, when in opaque films and which has a refractive index of 1.10 at 5000 Angstroms and 0.44 at 6500. Both of these may be used by us in providing mirrors of a range of colors, when used in films which are semi-transparent and which are sufficiently thin to cause color development through light interference effects. Other sulfides of a metallic luster, such as stibnite and molybdenite, having a refractive index of 4.3, and each of about 40% general reflectivity in the visible range with a slight bluish cast, are quite suitable. Pyrite, which reflects a maximum of 60% in the red and a minimum of 45% in the blue, may be used as may also silicon, normally of about 38% reflectivity, and having a refractive index of 3.8 to 4.2. Antimony, having a refractive index of 1.62 and a reflectivity of about 55%, can possibly be used. Fluorite or calcium fluoride, having a refractive index of 1.43, and other fluorides of about the same refractive index, may be used as a reflective layer, although these very transparent substances are of low reflectivity values, as previously mentioned. Thus, for fluorite the estimated reflectivity value would be 3 to 4% uniformly throughout the visible range and very thin films of this material give low reflectivity values and give light interference tints.

It is also possible to use films, which are in the desired thin range and which cause interference coloration of mirror type reflectors, in which the film is a jointly deposited mixture, chemical combination, or alloy of film-forming materials. For example, a jointly deposited mixture of gold and lead sulfide is suitable. It is obvious also that two or more extremely thin laminae, both semi-transparent, of two different substances may be used cooperatively to secure the interference colors.

While no color need be present in the material used as the semi-transparent reflecting layer, such as in the case of lead sulfide, the use of such materials as gold, showing selective specular reflection, as the semi-transparent layer, brings an additional source of possible variation of both the hues and spectral reflectivity characteristics in our final compound mirrors produced by using these layers backed by a relatively opaque reflective layer. The choice of a material for the semi-transparent reflective film which has color characteristics in its normal reflection, such as gold, imposes its normal reflection spectral limits, to some degree, on the general nature of the light reflected by the film and from which various spectral components are then subtracted by the light interference effects, depending on the thickness of the film used and its refractive index. Thus, in general, our compound mirrors made with a very thin semi-transparent upper layer of gold film are of higher total reflective values and thus brighter, and also of particularly higher reflectivity in the yellow and red, than are similar compound mirrors having thin semi-transparent upper layers of lead sulfide, the colors and reflectivities, in each case, being derived, to a main degree, by the interference effects arising from these layers in combination with the normal reflective characteristics for these materials and, in turn, further modified by the nature of the relatively opaque mirror backing used. Cuprite or cuprous oxide, which is a bright red and gives a reflectivity in bulk of about 20% and has a refractive index of 2.7, as well as ordinary cupric oxide have been found to be quite satisfactory as materials for use in the semi-transparent layers in making our compound colored mirrors.

Not all materials may be used for the forming of our thin semi-transparent mirror films in order to produce interference colors. Thus, silver is not useful, in our mirrors, for the making of our semi-transparent upper reflective layers while it is a preferred material for use as the relatively opaque backing reflective layer. This arises from the fact that all three factors which must be considered in producing our semi-transparent upper reflective films are of extreme and unfavorable values in the case of silver. First, its high reflectivity, 90% in bulk, permits little light to be passed to the second or back surface e of the thin films. Second, the films of silver have an extremely high absorption capacity for light and none of the small amount of light, which might possibly get to surface $e$, gets back again to the top surface. Consequently, there is no light to cause interference effects or colors. The absorption coefficient for light in the visible range is 10 to 30 times greater for silver as compared to similar thicknesses of other metallic substances. Silver is thus a very opaque substance. Third, it also has a very low refractive index, this being 0.17 for the visible range and, in consequence, quite thick films would be necessary to cause interference effects. Thus, for green light of 5000 Angstrom units or 0.5 micron wave length $$\frac{\lambda_a}{4N_s}$$

calculates as 0.74 micron as the necessary film thickness. Ordinary commercial silver mirrors are opaque and the coatings are 0.10 to 0.12 micron thick. Aluminum, which is of equally high reflectivity and has a refractive index of 1.44 and a fairly high degree of opacity, is also not useful in forming the semi-transparent upper reflective layers for our compound mirrors for similar reasons.

While our compound mirrors receive their colors from the thinness of the upper reflective film and the resultant light interference, and from the nature and reflective character of this film, and further from the reflective nature of the relatively opaque backing layer, it is apparent that we can further modify the color range and reflectivities of our mirrors, if we use instead of colorless glass, as the mirror support, a colored glass or other colored support body of transparent material. The color absorption characteristics of the support will limit the total reflectivity percentage possible and shift the general tones of color in the direction of the color of the glass or support material used.

In order to secure the necessary uniformity of thickness in our upper semi-transparent reflective films and thereby secure uniformity of color and reflectivity characteristics throughout a mirror body and to secure control of the desired variation in thickness of the very thin films desired, we have found it necessary to develop special methods of forming our semi-transparent mirror films.

Where the mirror films are deposited chemically, the deposition reactions must be greatly retarded, as compared with former operations. Thus, the reaction mixtures and temperatures of deposition must be changed toward slowing down the entire deposition process so as to give more uniform and even development of crystal nuclei and even slower than normal rates of growth onto these nuclei. This deposition process is described more fully in our co-pending application directed to Method of making colored mirrors, Serial No. 473,474, filed January 25, 1943, and in the following examples.

Figure 7:
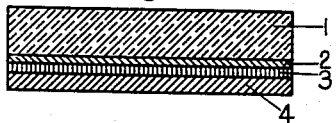
Figure 7 is a transverse vertical sectional view of a second surface mirror made according to our invention.

We find the deposition of our very thin semi-transparent reflective films by thermal evaporation of the substance within a high vacuum to be a particularly attractive method as uniform results are readily secured and the control of the desired thickness is quite simple. Our backing relatively opaque mirror films may be formed either by chemical deposition, by thermal evaporation, or by any other known means of producing an ordinary mirror film. As our compound mirrors may be easily scratched or otherwise spoiled, we generally coat these on the back with a protective layer of a paint lacquer, or shellac, or we may copper-plate these or protect the mirror back with other means common to the mirror art. The sectional view of Figure 7 illustrates a second surface mirror, made according to our invention, and which will consist of a glass or other support 1, the semi-transparent mirror film 2, the relatively opaque mirror film 3, and the protective coating 4. We may also form our mirrors by disposing the semi-transparent film on the top glass surface and the relatively opaque mirror film on the back surface of the support.

The nature of our new mirrors and their means of formation will be apparent from the following examples. In Examples Nos. 1 to 16, the thin upper semi-transparent reflective film is lead sulfide deposited by special chemical means, this film being of different thickness in each example and, in turn, in each case being backed with a relatively opaque silver mirror layer. Each of the mirrors is of different color and spectral and total light reflective characteristics. For comparison the characteristics of a simple semi-transparent reflective lead sulfide mirror film of a certain thickness are given and compared to the combination of such a mirror film with a backing layer of relatively opaque silver to demonstrate clearly the effects arising from the combination as compared to the semi-transparent layer alone.

EXAMPLES 1 TO 16

Ordinary plate glass is thoroughly cleaned, scrubbed with rouge and then rinsed thoroughly several times. The wet glass is then ready for mirroring. The mirroring is carried out at 68 degrees Fahrenheit and the solutions, glass and machines are all brought to this temperature by doing all the work in a constant temperature room regulated to this condition. This gives uniform conditions and with the mirroring solution used, the deposition proceeds at a constant rate so that the thickness of deposit is determined by the time the solution is permitted to act. Three aqueous solutions are made up for use as follows: Solution A, which contains 3.18% of sodium hydroxide and 0.00054% of sodium potassium tartrate. Solution B, which contains 3.7% of lead acetate and 0.264% of acetic acid. Solution C, which contains 2.64% of thiourea. These three solutions are mixed together in equal quantities just prior to their being poured onto the glass. The mixed solution at the time of pouring is of the following composition:

|  | Per cent |
|---|---|
| Sodium hydroxide | 1.06 |
| Lead acetate | 1.23 |
| Thiourea | 0.88 |
| Acetic acid | 0.088 |
| Sodium potassium tartrate | 0.00018 |

As compared with the method of forming lead sulfide mirrors shown in the patent to Colbert et al., 1,662,564, of March 13, 1928, it is seen that we use a higher concentration of lead acetate and a lower concentration of thiourea. These changes have the effects of increasing to some degree the laying down of the nuclei uniformly and of slowing down the rate of reaction. These effects are also enhanced by the use of a temperature of 68 degrees Fahrenheit in contrast to the 95 degrees or higher ordinarily employed in depositing lead sulfide mirrors. However, these changes alone have been found to be insufficient as it generally occurs, when mirror deposition is slowed down, that the securing of uniform deposits becomes more difficult. As it is particularly necessary that the thin mirror films be extremely uniform because of their consequent variation in color, if not, and also because of their semi-transparent nature, we have found it necessary to add a new substance having a retarding effect on the deposition rate and one which facilitates very uniform deposition. This substance is preferably sodium potassium tartrate. It is believed that the sodium potassium tartrate, which is used in very small amounts as it has a substantial effect, operates by possibly decreasing greatly the rate of growth of lead sulfide on already deposited nuclei. Thus, greater numbers of nuclei are apparently caused to form and the growth on these nuclei becomes slow and uniform in every direction. While the deposition rate of the formula of Patent 1,662,564 can be decelerated by working even below 68 degrees Fahrenheit or by using less alkali, neither of these procedures will give satisfactory uniformity for the opaque ordinary type lead sulfide mirror is secured, in which the thickness of coating is about 0.140 micron. Mirrors of this thickness with lead sulfide are usually laid down in about 7 minutes, using the solution of Patent No. 1,662,564, and these mirrors show no color, as indicated by the spectral reflection curve of Figure 1, and are opaque. For the spectral reflectivity curve shown, the total reflectivity is 29%.

By adding a large amount of water to the pans at the times indicated in the following Table I, the semi-transparent upper reflective deposits of lead sulfide numbered 1a to 16a were made. The various colors and spectral reflectivity exhibited by these mirror films, as well as their semi-transparent nature, is shown by the data in this table. Diluting the chemical solution with a large amount of water stopped the deposition reaction at the times indicated. The mirrors were then flushed with considerable water and the surface thoroughly cleaned by gently rubbing with wet cotton.

*Table I*

| Example No. | Time of forming, minutes | Color | Total percent reflectivity | Total percent transmission | Spectral minimum | Film thickness, microns | Wave factors | No. of times ray reflected |
|---|---|---|---|---|---|---|---|---|
| 1a | 12.3 | Bluish gray | 33.8 | 45 | 7,500 | .024 | $\frac{\lambda}{8N}$ | 2 |
| 2a | 13.3 | Pale yellow | 35.7 | 42 | 4,000 | .026 | $\frac{\lambda}{4N}$ | 1 |
| 3a | 14.2 | Bright yellow | 34.4 | 40 | 4,400 | .028 | " | 1 |
| 4a | 15.2 | Orange yellow | 31.7 | 37 | 4,700 | .030 | " | 1 |
| 5a | 16.1 | Red yellow | 28.2 | 35 | 4,950 | .032 | " | 1 |
| 6a | 17.7 | Purple red | 24.9 | 33 | 5,250 | .034 | " | 1 |
| 7a | 18 | Red purple (mauve) | 21.6 | 30 | 5,500 | .036 | " | 1 |
| 8a | 19.4 | Purple | 21.2 | 28 | 5,900 | .038 | " | 1 |
| 9a | 20.6 | Purple blue | 20.9 | 26 | 6,300 | .040 | " | 1 |
| 10a | 22.6 | Clear blue | 19.8 | 23 | 6,850 | .044 | " | 1 |
| 11a | 23.3 | Blue green | 20.0 | 21 | 7,300 | .046 | " | 1 |
|  |  |  |  |  | 4,600 | .046 | $\frac{5\lambda}{16N}$ | 1 |
| 12a | 24 | Grayish pale yellow | 21.8 | 19 | 4,800 | .047 | " | 1 |
| 13a | 24.4 | Grayish yellow | 23.2 | 18 | 4,950 | .048 | " | 1 |
| 14a | 25.6 | Grayish red | 24.8 | 17 | 5,200 | .050 | " | 1 |
|  |  |  |  |  | 7,200 | .050 | $\frac{3\lambda}{8N}$ | 2 |
| 15a | 28.5 | Grayish purple | 24.8 | 16 | 5,800 | .056 | $\frac{5\lambda}{16N}$ | 1 |
| 16a | 33.2 | Silvery blue | 21.8 | 12 | 6,700 | .065 | " | 1 | making of good interference colored mirrors. The use of the small amount of sodium potassium tartrate is thus very desirable, although we have found that other materials may be used as retarders, as indicated in our said co-pending application.

In order to overcome the limiting of the amount of solution in contact with the glass at its edge by surface tension effects and the variation in deposit thickness at the edges, as a consequence, we find it preferable, in order to secure very uniform results, to place the wet glass to be mirrored in a stainless steel pan, precoated with lead sulfide, and to rock the pan about 35 times a minute using a metal frame insert in the bottom of the pan to keep the glass from shifting. Approximately 2.8 cc. of mixed solution per square inch of glass to be treated is poured over the glass in the tray and the rocking keeps this liquid uniformly flowing over the surface of the glass during the entire deposition.

With our new mixed solution, after about 8.5 minutes from the time of pouring, a darkening of the glass can first be noticed and the thickness of mirror film becomes progressively greater as the time increases. If the deposition is allowed to proceed for about 60 minutes, a completely The mirrors were then flushed with considerable water and the surface thoroughly cleaned by gently rubbing with wet cotton. The wet glasses were then placed on a regular silvering table with the lead sulfide surface up and a silver mirror deposit was formed directly on top of the lead sulfide layer, using any of the regular chemical silvering formulae. For example, we may pour onto the glass, at about 70 degrees Fahrenheit, a freshly mixed solution of 1.2% silver nitrate, 1.2% sodium hydroxide, 3.75% of concentrated ammonia water, and 0.20% invert sugar, all dissolved in water. After about ten minutes, the solution may be rinsed off and the silver back formed may be rinsed thoroughly and dried, after which a protective coating of shellac may be applied on top of the silver. The semi-transparent lead sulfide coatings 1a to 16a were thus used, respectively, in forming the compound mirror Examples 1 to 16, given in Table II which follows.

In Table II, each of the mirrors is a compound colored mirror made with a thin semi-transparent lead sulfide reflecting film of increasing thickness, going from Example 1 through Example 16, which film causes light interference effects, and an opaque silver mirror backing film. This table shows the color of the mirrors, thus produced, and their total reflectivity value. Each of the mirrors was perfectly uniform in color and a good reflector. As will be seen in the table, the spectral range was traversed twice, the colors being particularly clear and bright in the first series. Comparison of the Examples 1 to 16 with the simple semi-transparent mirror films shown in Table I as samples 1a to 16a, which were used in making Examples 1 to 16, showed that by the use of the backing reflector, the colors were made deeper and the mirrors were mostly brighter, or as the two tables show the total percentage reflectivity was, in general, though not always, increased.

waves, is related to the wave length by the ratio of $$\frac{\lambda}{4N}$$

Figure 11:
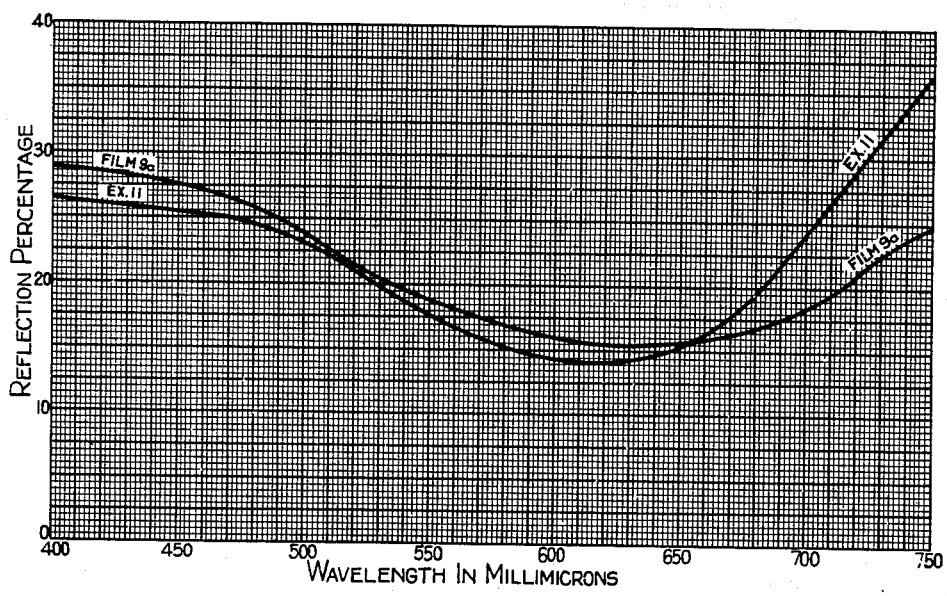
Figure 11 is a similar view illustrating the comparable curves for another thickness of lead sulfide film.

The apparent color of these mirrors is obviously largely dependent upon the color of the light removed by interference. Thus, in Example 11, the spectral reflectivity curve of which is shown in Figure 11, the light removed by interference is in the yellow and orange and, in consequence, the mirror appears purple-blue, since the blue and red are the residual light which is reflected. The compound mirror of Example 11, as shown in the

*Table II*

| Example No. | Color | Total per cent reflectivity | Spectral minimum | Lead sulfide film thickness, microns | Wave factors | Number of times reflected |
|---|---|---|---|---|---|---|
| 1 | Gray blue | 24.3 | 7,200 | 0.022 | $\frac{\lambda}{8N}$ | 2 |
| 2 | Bluish yellow | 35.0 | 7,800 | .025 | " | 2 |
| 3 | Pale yellow | 36.6 | 4,000 | .026 | $\frac{\lambda}{4N}$ | 1 |
| 4 | Yellow | 39.4 | 4,250 | .027 | " | 1 |
| 5 | Yellow gold | 37.1 | 4,500 | .029 | " | 1 |
| 6 | Orange | 35.2 | 4,800 | .031 | " | 1 |
| 7 | Red orange | 33.7 | 4,850 | .032 | " | 1 |
| 8 | Orange red | 33.6 | 5,100 | .033 | " | 1 |
| 9 | Purple red | 29.4 | 5,250 | .034 | " | 1 |
| 10 | Red purple | 25.6 | 5,600 | .036 | " | 1 |
| 11 | Purple blue | 21.5 | 6,150 | .040 | " | 1 |
| 12 | Green blue | 20.1 | 6,700 | .043 | " | 1 |
| 13 | Blue green | 20.4 | 6,950 | .045 | " | 1 |
| | | | 4,700 | .045 | $\frac{5\lambda}{16N}$ | 1 |
| 14 | Gray yellow | 21.1 | 7,500 | .048 | $\frac{\lambda}{4N}$ | 1 |
| | | | 5,000 | .048 | $\frac{5\lambda}{16N}$ | 1 |
| 15 | Gray red | 24.6 | 5,400 | .052 | " | 1 |
| 16 | Gray purple | 22.9 | 5,900 | .057 | " | 1 |

The spectral reflectivity curves for these compound mirrors each shows a dip in the curve or minima, as can be seen in the case of those Examples Nos. 3, 6, 9, 11, 14 and 1, for which the curves are given in Figures 8 to 13, respectively. By comparison, the spectral reflectivity curve for an ordinary opaque film lead sulfide mirror, as shown in Figure 1, is free of any dip or indication of color. The minima in the spectral reflectivity curves shows the light rays which are being diminished in the reflected light by interference. As would be expected for intereference effects, the minima continually shift in the examples toward the longer red rays, as the film thickness of the semi-transparent lead sulfide layer, in the examples, is increased. The wave length at which the minima appear in the spectral reflection curves for the various samples, in both Tables I and II, are shown as well as the thickness of the lead sulfide layer. It will be noted that while the compound mirror produced, as Example 1, was made using the lead sulfide coated glass, Example 1a, the film thicknesses in the two cases, as well as in the other corresponding cases, are not shown as being the same. It was found that some small amount of the lead sulfide, in each case, was lost or dissolved away during the silvering so that, in each case in Examples 1 to 16, the lead sulfide films in the final compound mirrors were thinner than in Examples 1a to 16a.

In Examples 3 to 14, the semi-transparent lead sulfide reflective layer thickness, at which the interference minima occur with the different light waves, is related to the wave length by the ratio same Figure 11, reflects red light to a much larger degree than a similar thickness semi-transparent lead sulfide reflective film, Example 9a, not having the opaque silver mirror backing, and is redder and brighter in consequence.

The second spectral series of compound colored mirrors, namely Examples 13 to 16, show as indicated in Table II, minima in the reflectivity spectra at the thicknesses of the semi-transparent lead sulfide layer which correspond to the ratio of $$\frac{5\lambda}{16N}$$

Figure 12:
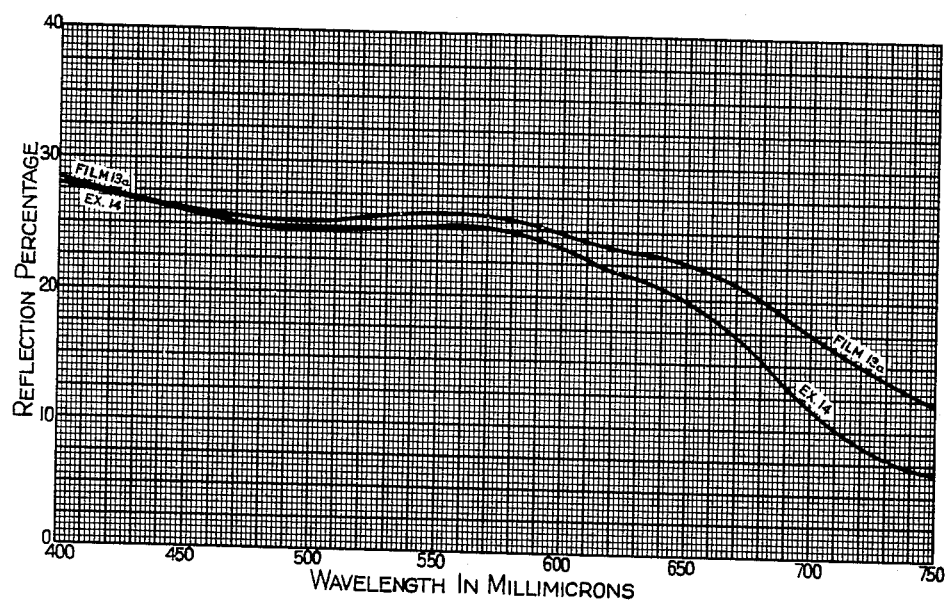
Figure 12 is a similar view for a further different thickness of lead sulfide film.
Figure 13:
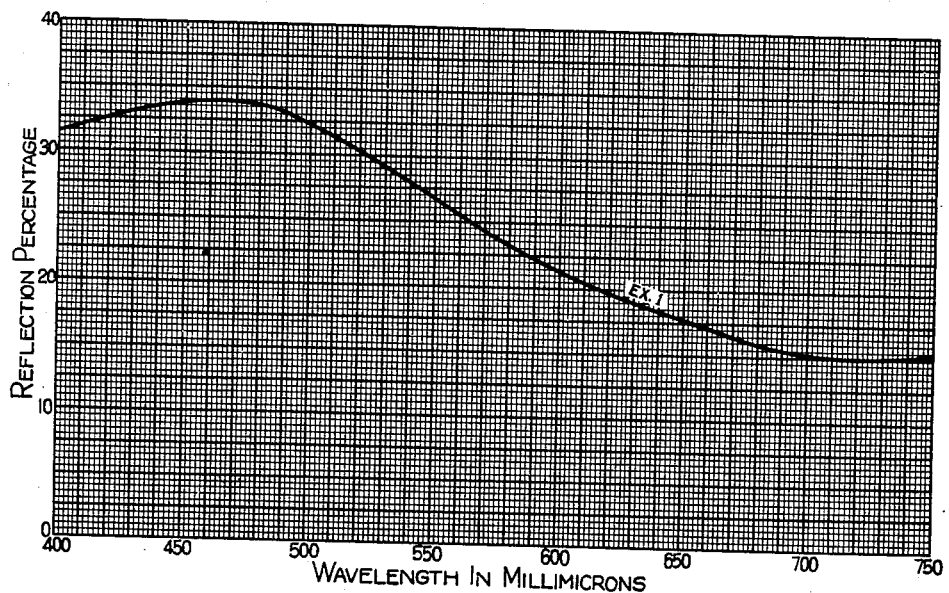
Figure 13 is a diagram of the spectral reflectivity of one of our compound mirrors.

Interference at these thicknesses, would be only partial and these minima in the curves are very shallow and, as a result, the colors are not as bright or as clear in tone in these cases as in the first spectral series of Examples 1 to 12. In Figure 12, the interference minima at 5000 Angstrom units corresponding to the thickness wave relationship of $$\frac{5\lambda}{16N}$$

is quite shallow, as compared with the minima at 7500 also shown by Example 14 and which corresponds to the wave factor $$\frac{\lambda}{4N}$$

In mirrors Examples 1 and 2, reflected interference rays and minima occurred in the deep red end of the spectra at film thicknesses for the semi-transparent upper layer of lead sulfide corresponding to $$\frac{\lambda}{8N}$$

In these, the red rays were evidently reflected twice within the semi-transparent lead sulfide reflective layer before emerging, as illustrated in Figure 5 by ray *f*. The lead sulfide film is highly transparent in the deep red and this higher transparency makes interference by the doubly reflected red rays possible. The spectral reflectivity curve of Example 1 is given as Figure 13.

Figure 9:
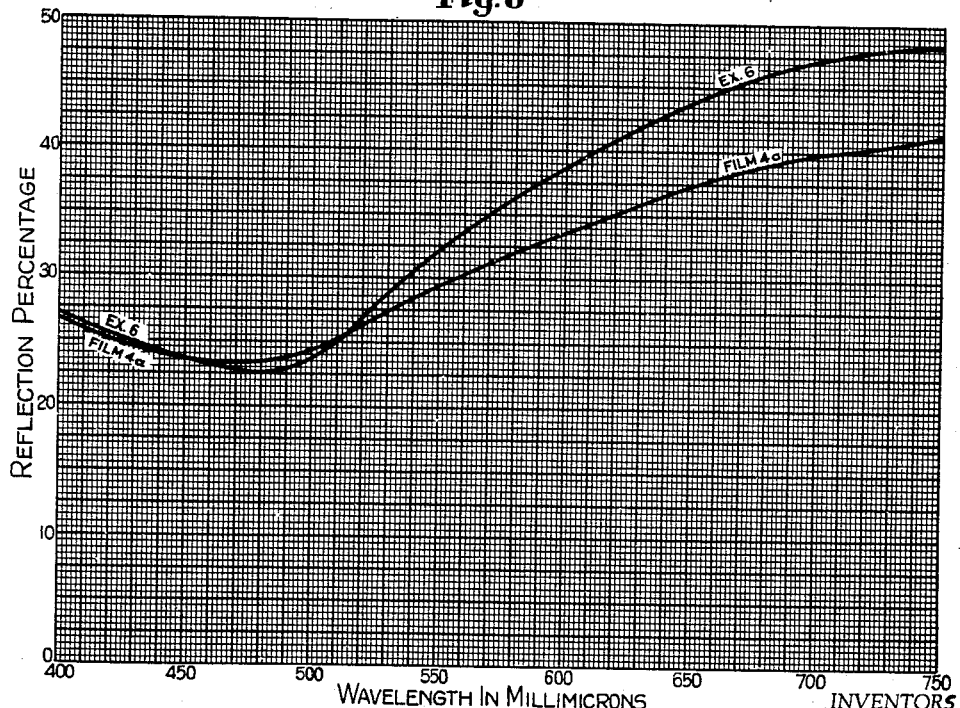
Figure 9 is a similar view comparing the effects produced by a simple semi-transparent lead sulfide film of a different thickness than that of Figure 8 with the combination of a similar thickness of such film and an opaque silver film.
Figure 10:
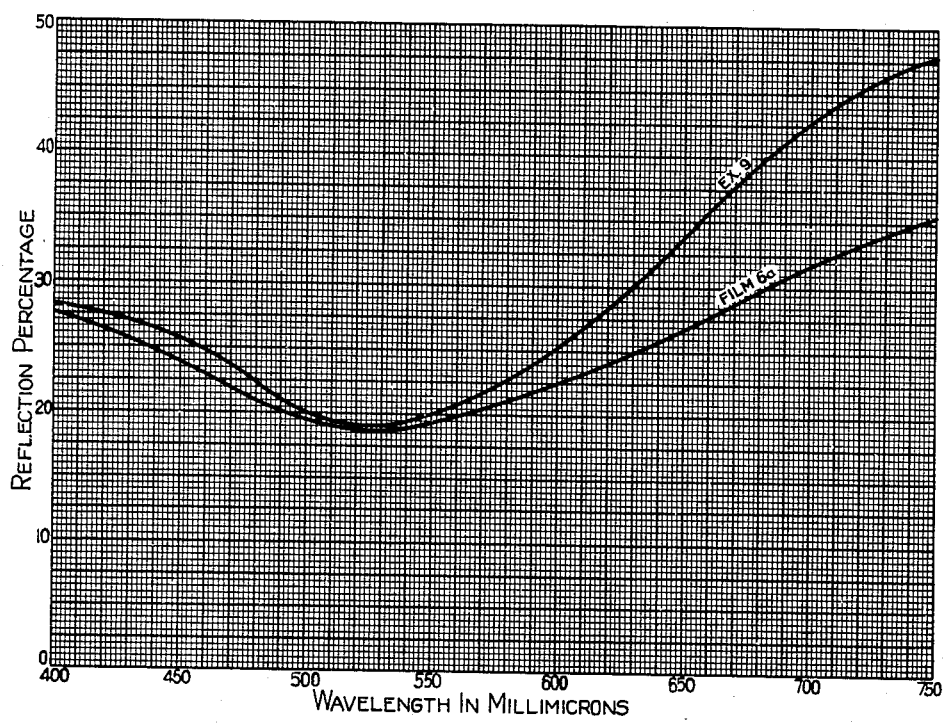
Figure 10 is a smaller view but using a different thickness of lead sulfide film.

In order to more clearly bring out the nature of the color and reflective characteristics of our new compound mirrors and how the backing layer of an opaque mirror, such as silver, plays a part in determining these characteristics, the spectral reflectivity curves in Figures 8 to 12 are given. In each figure, the reflectivity curve for one of our new compound mirrors is given and compared with the spectral reflectivity curve for an equally thick semi-transparent lead sulfide reflective film which has not been backed up with silver. Thus, in Figure 8 the film of Example 2a of Table I is compared with our Example 3. Each curve shows the dip in its curve at the same place as caused by interference. The silver-backed example has, however, a higher reflection in the green and a higher total reflection. In Figure 9, the film of Example 4a is compared with Example 6 and a much higher reflectivity in the yellow, orange and red is to be noted with the silver-backed mirror and the total reflectivity is 35.2%, as compared with 31.7%. In Figure 10, with thicker lead sulfide films the position of the minima is shifted more towards the longer wavelengths but the greater reflection of the orange and red light, by Example 9 as compared with film 6a, is very apparent. Very little additional light is reflected in the blue end of the spectra, this no doubt being partly due to the poor reflectivity of silver in the blue but more possibly due to a high absorption or lack of transparency of lead sulfide for blue light. The backed mirror reflects 29.4% of light and the unbacked mirror only 24.9%. In Figure 11, the spectral curves for a semi-transparent reflective lead sulfide film 9a of .040 micron thickness is compared with Example 11, having a similar thickness lead sulfide layer backed by an opaque silver mirror. Here the yellow rays are now cut down by interference to a greater extent in our Example 11, since more yellow is sent back to the top surface of the mirror combination and, in this case, out of phase so that greater interference occurs. In the red, greater reflection occurs since this light is not out of phase in this mirror. In Figure 12, showing the curves for reflective film of Example 13a and our Example 14, however, the interference is occurring in the red and, as expected, the silver-backed mirror shows a much greater loss of red than occurs in the unbacked reflective layer. In this case, the silver-backed mirror actually has a lower total reflectivity, this being 21.1% as against 23.2% for the unbacked film.

It is quite obvious from these curves that the films of lead sulfide are not only quite transparent in the thicknesses used in our mirrors, as shown in Table I, but that this particular material in these thicknesses is proportionally more tranparent in the reds and, as a result, backing up these films with a material reflecting in the red, such as silver, brings about considerable changes in the red reflectivity, increasing this in some cases and very definitely decreasing this when the lead sulfide layer is of the right thickness to cause interference losses in the red.

The mirrors of Examples 1 to 16 may be used in furniture, in store decoration, and in a wide variety of decorative and reflector uses.

EXAMPLE 17

A wine glass, or other hollow glass article, of ordinary colorless glass may be thoroughly cleaned and brought to 68 degrees Fahrenheit and the mixed solution used in the previous examples, in forming the semi-transparent lead sulfide coatings, is poured into the same while maintaining agitation within the glass by a mechanical stirrer. In this way, we can secure a semi-transparent reflective coating on the interior of the glass article. If the solution is poured out after 17.7 minutes and the coating action stopped by flushing the glass with water, the coating will be similar to film 6a, as shown in Table I. A gold coating is then deposited chemically on top of the lead sulfide coating using any of the known solutions for forming a gold mirror. For example, a mixture of gold chloride solution and an alkaline formaldehyde solution, mixed just before pouring into the glass, may be used. As poured, an aqueous solution containing 1.3% potassium carbonate, 0.163% commercial formaldehyde solution, and 0.325% of gold chloride may be used. After the coating with gold, the tumbler is flushed out and swabbed out with soft wet cotton and then dried with warm air. It is then coated further on the inside with a layer of clear varnish, preferably of an alkyl resin type. A tumbler is thus produced which has a gold reflection inside and which, on the outside, has a brilliant orange mirror reflection generally similar to that shown by Example 6 above but of the slightly lower total reflectivity of 34.6%.

In a similar way, other shaped transparent articles may be given a colored metallic reflection and the color may be varied, by varying the thickness of the semi-transparent reflective layer and the nature of the opaque backing mirror layer.

EXAMPLE 18

In preparing the semi-transparent lead sulfide reflective coating for Example 6, we arrange to blow a fine gentle current of air on the top of the glass plate, while it is in the pan being coated with the lead sulfide, and do so at several points. The resulting mirror produced when backed with a coating of silver will not be of one uniform color throughout but will show a variegated pattern in various colors. This is due to the fact that the film thickness of the deposited lead sulfide at various points on the glass will vary and the effects of the backing layer of silver will also vary at the different spots.

EXAMPLE 19

If a pale green glass "Sdlex," made by Pittsburgh Plate Glass Company, is used in making Example 4, the mirror secured is of a beautiful brilliant green.

EXAMPLE 20

In a high vacuum, we may deposit upon a piece of ordinary plate glass, which has been cut to rear view automotive size and well cleaned, a thin film of lead sulfide of 0.036 micron thickness. The lead sulfide, or granulated galena, may be placed within an electrically heated tungsten wire coil in order to bring about the thermal evaporation in the vacuum which proceeds readily. Uniform deposits are secured by using multiple electrodes suitably arranged as practiced in thermal evaporation work. This gives a film of semi-transparent reflective lead sulfide similar to the chemically deposited film of Example 7a shown in Table I. Backing this film by forming an opaque film of silver about 0.100 micron thick by chemical deposition, such as by use of the silvering composition shown under Examples 1 to 16 for at least ten minutes applied to the firstly formed lead sulfide deposits, gives a compound mirror which has all the characteristics shown with reference to previous Example 7. This mirror is of a red-orange color. The silver backing layer is more preferably applied by thermally evaporating the silver, subsequent to depositing the lead sulfide layer. In this case, no lead sulfide is etched away as occurs when using the silvering solutions. The lead sulfide in the completed mirror is 0.036 micron thick. In this case, a mirror identical to Example 10, having a red-purple color is produced.

A backing of thermally evaporated aluminum may also be used in this example and the mirror will be practically identical with Example 10 and will show the same red-purple color.

As a protection, we coat the backs of these mirrors with a black lacquer or may use other protective coatings. Each of the three mirrors so produced may be used as an automotive rear view mirror.

EXAMPLE 21

If we use a piece of the pale green glass "Solex" and form a lead sulfide layer, of the type used in Example 20, thereupon, which is 0.036 micron thick and then deposit, by thermal evaporation, an opaque layer of silver on this, we secure instead of a red-purple mirror, like Example 10, a very brilliant blue-green mirror.

EXAMPLE 22

A front surface mirror is produced by thermally evaporating aluminum upon glass until an opaque layer has been secured. Lead sulfide is then thermally evaporated on top of this to a thickness of 0.029 micron. The lead sulfide surface is then coated with a transparent protective lacquer. From the lead sulfide or front surface, the mirror has a yellow-gold color, like that shown by Example 5, but is of somewhat higher total reflectivity. Looking through the glass a second-surface ordinary aluminum mirror reflection appears.

Figure 7A:
Figure 7a is a transverse sectional view illustrating a first surface mirror made according to our invention.
Figure 8:
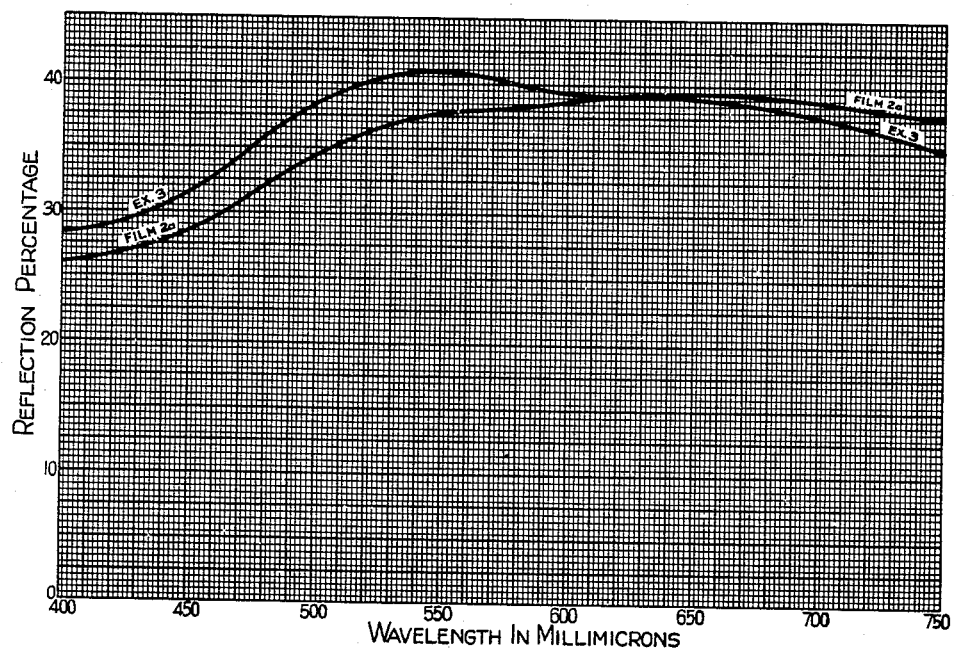
Figure 8 is a diagram illustrating for comparison a spectral reflection curve of a simple semi-transparent film of lead sulfide and a spectral reflection curve of our compound mirror made by using a semi-transparent film of lead sulfide of comparable thickness plus an opaque backing-up film of silver.

A transverse sectional view of a first-surface mirror, made according to our invention is illustrated in Figure 7a. The mirror consists of a suitable support 1a, which need not have parallel surfaces, a relatively opaque backing mirror layer 3a, a semi-transparent light interference producing layer 2a, and a protecting film 4a.

EXAMPLE 23

In carrying out the operations of Example 22, a plastic button of dark Bakelite and a button of polymerized clear transparent methyl methacrylate resin were mounted alongside the glass and given the same two successive coatings. In each case, a yellow-gold colored button of high metallic reflection was secured.

EXAMPLE 24

An opaque layer of chromium was deposited in a high vacuum, by thermal deposition, upon a smooth supporting body, such as glass, and on top of this a thin film of calcium fluoride 0.087 micron thick was then deposited. The two evaporations were carried out in the usual manner, the time required for securing the desired thickness of fluorite being dependent upon the heating of the coil used in the evaporation and the distance of the glass from the coils. This film thickness of fluorite caused interference of the green 5000 Angstrom wave length light and the compound mirror had a light-purplish reflection tone from its front surface.

EXAMPLES 25 TO 30

Gold is readily deposited on a glass support or other suitable support by thermal evaporation within a high vacuum. Semi-transparent reflective films of gold in three thicknesses were thus prepared on glass supports and showed the following properties.

Table III

| Film thickness, microns | Front surface reflectivity | Color by reflection | Total light transmission | Color by transmission |
|---|---|---|---|---|
| | Per cent | | Per cent | |
| 0.006 | 20 | Light copper red | 68 | Light green yellow. |
| 0.013 | 36 | Deep copper red | 44 | Pale yellow green. |
| 0.025 | 54 | Golden yellow | 30 | Deep blue green. |

Each of the three glass supports was first coated with an opaque layer of chromium by thermal evaporation and each of three other glass supports was first coated with aluminum in an opaque layer. The reflectivity of the chromium mirrors was approximately 50% and the reflectivity of the aluminum mirrors was 90%. The coated surface of each of these glasses was then coated with gold by thermal evaporation, the three respective thicknesses of gold deposit being used in each set. Thus, six first-surface mirrors were produced in which the semi-transparent gold layer was on the top surface. Each mirror was of a much different reflectivity and color than the simple gold films, as shown in the following Table IV.

Table IV

| Example No. | Gold layer thickness, microns | Backing reflector material | Front surface reflectivity | Color of mirror |
|---|---|---|---|---|
| | | | Per cent | |
| 25 | 0.006 | Chromium | 50 | Very pale yellow. |
| 26 | 0.013 | do | 60 | Light yellow. |
| 27 | 0.025 | do | 72 | Gold. |
| 28 | 0.006 | Aluminum | 83 | Very pale yellow. |
| 29 | 0.013 | do | 81 | Light yellow. |
| 30 | 0.025 | do | 79 | Gold. |

The shift in colors indicates clearly that the green and blue light transmitted by the semi-transparent gold films, as shown by the transmission colors of these single films in Table III, is reflected in our compound mirrors having either chromium or aluminum backing reflector coatings. The marked increase found in our compound mirrors in total reflectivity also indicates these effects. The colors by reflection of the simple gold films show that interference effects are active and these continue in the compound mirrors.

EXAMPLES 31 TO 36

Three pieces of glass were coated by thermal evaporation in a high vacuum with an opaque layer of chromium and three others with an opaque layer of aluminum as in Examples 25 to 30. One of each of these as well as plain pieces of glass were then coated by thermal evaporation with a thin semi-transparent layer of copper. The others were similarly treated using two other thicknesses of copper deposit.

The three simple semi-transparent deposits of copper on glass showed the following reflective properties as given in the first two examples of Table V.

*Table V*

| Film thickness, microns | Front surface reflectivity | Color by reflection first surface | Total light transmission | Color by transmission |
|---|---|---|---|---|
| | *Per cent* | | *Per cent* | |
| 0.011 | 20 | Blue | 53 | Light pinkish brown. |
| 0.024 | 35 | Purple | 28 | Reddish brown. |
| 0.063 | 59 | Pale copper | 4 | Brownish green. |
| 0.138 | 59 | Copper | 0.01 | Opaque. |

The properties of a relatively opaque copper film are also presented for comparison in the last two examples of Table V.

In the following Table VI are shown the properties of the six compound mirrors and it is apparent that their color arises from both light interference and from the reflective properties of the backing mirror films. The increased reflectivity in these mirrors is marked, where the semi-transparent copper layer was of high light transmission, and small, in the two examples made with the copper films transmitting only 4% of visible light.

*Table VI*

| Example No. | Copper layer thickness, microns | Backing reflector material | Front surface reflectivity | Color of mirror |
|---|---|---|---|---|
| | | | *Per cent* | |
| 31 | 0.0108 | Chromium | 45 | Very pale gray yellow. |
| 32 | 0.024 | do | 54 | Light gray copper. |
| 33 | 0.063 | do | 58 | Light copper. |
| 34 | 0.011 | Aluminum | 70 | Very pale yellow. |
| 35 | 0.024 | do | 66 | Light reddish yellow. |
| 36 | 0.063 | do | 61 | Light copper. |

Thus, mirrors produced as in the above examples will have a desired color and reflectivity value. The color indicated in each example will be the color of the mirror when viewing it directly. When viewing the mirror at different angles, the shade of the color will vary slightly but it will always be the same basic color.

It will be apparent from the above description that we have provided colored mirrors or other reflective surfaces of a wide range of color characteristics and of a wide range of reflectivity percentage characteristics which can be controlled as desired. The color values in the reflective mirror films are secured primarily by the light interference effects but are modified by the selective light transmission and absorption and the reflective character of our semi-transparent layers and as further modified by the reflective nature of the relatively opaque backing reflective layer. As the colors are thus produced by physical effects, they are permanent and non-fading and the colored mirrors are inexpensive.

Various other advantages will be apparent from the preceding description and the following claims.

Having thus described our invention, what we claim is:

1. A mirror having an effective reflectivity to produce an adequate clear reflected image and also producing visually effective color comprising a transparent support element, a partially transparent continuous light reflective film element on a surface of said support element, said film element inherently producing color by light ray interference and having a thickness falling within a range having a minimum of $$\frac{\lambda}{8N}$$

and a maximum of $$\frac{9\gamma}{4N}$$

in which $\lambda$ represents a wave length of light at which said film element gives a minimum of reflected light and $N$ represents the refractive index of said film element and a substantially opaque light reflective film element on the back surface of one of said first mentioned elements and formed of a different material than that of said first mentioned film element, said last mentioned film element reflecting light back through said first mentioned film element and modifying the color produced by said first mentioned film element.

2. A mirror having an effective reflectivity to produce an adequate clear reflected image and also producing visually effective color comprising a transparent support element, a continuous light reflective lead sulfide film element on a surface of said support element, said film element being of greater reflectivity than that of said support element and inherently producing color by light ray interference and having a thickness between $$\frac{\lambda}{8N}$$

and $$\frac{3\lambda}{8N}$$

inclusive, in which $\lambda$ represents a wave length of light at which said film element gives a minimum of reflected light and $N$ represents the refractive index of said film element, and a substantially opaque light reflective film element on the back surface of one of said first mentioned elements and formed of a different material than that of said first mentioned film element, said last mentioned film element reflecting light back through said first mentioned film element and modifying the color produced by said first mentioned film element.

3. A colored second surface mirror having an effective reflectivity to produce an adequate clear reflected image and also producing visually effective color comprising a transparent support, a partially transparent continuous light reflective film on the back surface of said support, said film inherently producing color by light ray interference and having a thickness falling within a range defined by a relatively low multiple of $$\frac{\lambda}{4N}$$

and having a minimum of $$\frac{\lambda}{8N}$$

in which $\lambda$ represents a wave length of light at which said film gives a minimum of reflected light and N represents the refractive index of said film, and a substantially opaque light reflective film on the back surface of and formed of a different material of different refractive index than said first mentioned film, said last mentioned film reflecting light forwardly and modifying the color produced by said first mentioned film.

4. A colored first surface mirror having an effective reflectivity to produce an adequate clear reflected image and also producing visually effective color comprising a support, a substantially opaque light reflective film on the front surface of said support, a partially transparent continuous light reflective film on the front surface of said first mentioned film, said last mentioned film inherently producing color by light ray interference and having a thickness falling within a range having a minimum of $$\frac{\lambda}{8N}$$

and a maximum of $$\frac{9\lambda}{4N}$$

in which $\lambda$ represents a wave length of light at which said last mentioned film gives a minimum of reflected light and N represents the refractive index of said last mentioned film, said first mentioned film being of different material and different refractive index than said last mentioned film and reflecting light forwardly and modifying the color produced by said last mentioned film.

5. A mirror having an effective reflectivity to produce an adequate clear reflected image and also producing visually effective color, comprising a transparent support element, a partially transparent continuous light reflective film element on a surface of said support element, said film element having a reflectivity greater than ten percent and inherently producing color by light ray interference and having a thickness between .024 micron and .065 micron, inclusive, and a substantially opaque light reflective film element on the back surface of one of said first mentioned elements and formed of a different material than that of said first mentioned film element, said last mentioned film element reflecting light forwardly through said first mentioned film element and modifying the color produced by said first mentioned film element.

6. A colored mirror having an effective reflectivity to produce an adequate clear reflected image and also producing visually effective color comprising a support, a partially transparent continuous light reflective film inherently producing color by light ray interference and having a thickness falling within a range having a minimum of $$\frac{\lambda}{8N}$$

and a maximum of $$\frac{9\lambda}{4N}$$

in which $\lambda$ represents a wave length of light at which said film gives a minimum of reflected light and N represents the refractive index of said film, and a substantially opaque light reflective film absorbing at least one color transmitted by the partially transparent film on the back surface of and of different material and different refractive index than said first mentioned film and reflecting light forwardly through said first mentioned film and modifying the color produced by said first mentioned film, one of said films being on a surface of said support.

WILLIAM H. COLBERT.
WILLARD L. MORGAN.